(12) United States Patent
Youngquist et al.

(10) Patent No.: US 11,734,876 B2
(45) Date of Patent: *Aug. 22, 2023

(54) SYNTHESIZING AN IMAGE FROM A VIRTUAL PERSPECTIVE USING PIXELS FROM A PHYSICAL IMAGER ARRAY WEIGHTED BASED ON DEPTH ERROR SENSITIVITY

(71) Applicant: Proprio, Inc., Seattle, WA (US)

(72) Inventors: James Andrew Youngquist, Seattle, WA (US); David Julio Colmenares, Seattle, WA (US); Adam Gabriel Jones, Seattle, WA (US)

(73) Assignee: Proprio, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,983

(22) Filed: Feb. 4, 2022

(65) Prior Publication Data

US 2022/0157011 A1    May 19, 2022

Related U.S. Application Data

(60) Continuation of application No. 16/833,481, filed on Mar. 27, 2020, now Pat. No. 11,276,225, which is a
(Continued)

(51) Int. Cl.
*G06T 15/20* (2011.01)
*G06T 7/55* (2017.01)
*G06T 15/40* (2011.01)
*G06T 7/70* (2017.01)
*G06T 15/06* (2011.01)
*G06T 7/20* (2017.01)

(52) U.S. Cl.
CPC ............ *G06T 15/20* (2013.01); *G06T 7/20* (2013.01); *G06T 7/55* (2017.01); *G06T 7/70* (2017.01);
(Continued)

(58) Field of Classification Search
None
See application file for complete search history.

(56) References Cited

U.S. PATENT DOCUMENTS

| 7,085,409 B2 | 8/2006 | Sawhney et al. |
| 8,218,854 B2 | 7/2012 | Liu et al. |
(Continued)

FOREIGN PATENT DOCUMENTS

| WO | WO 2014/145722 A2 | 9/2014 |
| WO | WO 2018/021067 A1 | 2/2018 |

OTHER PUBLICATIONS

PCT International Search Report and Written Opinion, PCT Application No. PCT/US19/39998, dated Oct. 16, 2019, 10 pages.
(Continued)

*Primary Examiner* — Kyle Zhai
(74) *Attorney, Agent, or Firm* — Fenwick & West LLP

(57) ABSTRACT

A method assigns weights to physical imager pixels in order to generate photorealistic images for virtual perspectives in real-time. The imagers are arranged in three-dimensional space such that they sparsely sample the light field within a scene of interest. This scene is defined by the overlapping fields of view of all the imagers or for subsets of imagers. The weights assigned to imager pixels are calculated based on the relative poses of the virtual perspective and physical imagers, properties of the scene geometry, and error associated with the measurement of geometry. This method is particularly useful for accurately rendering numerous synthesized perspectives within a digitized scene in real-time in order to create immersive, three-dimensional experiences for applications such as performing surgery, infrastructure inspection, or remote collaboration.

20 Claims, 7 Drawing Sheets

Related U.S. Application Data division of application No. 16/457,780, filed on Jun. 28, 2019, now Pat. No. 10,650,573.

(60) Provisional application No. 62/692,619, filed on Jun. 29, 2018.

(52) U.S. Cl.
CPC .............. G06T 15/06 (2013.01); G06T 15/40 (2013.01); *G06T 2210/21* (2013.01)

(56) References Cited

U.S. PATENT DOCUMENTS

| | | |
|---|---|---|
| 8,855,408 B2 | 10/2014 | Kim et al. |
| 9,129,377 B2 | 9/2015 | Ciurea et al. |
| 9,240,049 B2 | 1/2016 | Ciurea et al. |
| 9,361,662 B2 | 6/2016 | Lelescu et al. |
| 9,462,164 B2 | 10/2016 | Venkataraman et al. |
| 9,800,856 B2 | 10/2017 | Venkataraman et al. |
| 2010/0329358 A1 | 12/2010 | Zhang et al. |
| 2017/0200254 A1 | 7/2017 | Kopf et al. |

OTHER PUBLICATIONS

Saito, H. et al., "Appearance-Based Virtual View Generation From Multicamera Videos Captured in the 3-D Room," IEEE Transactions on Multimedia, Sep. 2003, vol. 5, No. 3, pp. 303-316.

European Patent Office, Extended European Search Report, European Patent Application No. 19824848.6, dated Feb. 4, 2022, eight pages.

United States Office Action, U.S. Appl. No. 16/833,481, filed Oct. 4, 2021, 11 pages.

SYNTHESIZING AN IMAGE FROM A VIRTUAL PERSPECTIVE USING PIXELS FROM A PHYSICAL IMAGER ARRAY WEIGHTED BASED ON DEPTH ERROR SENSITIVITY

CROSS-REFERENCE TO RELATED APPLICATIONS

This application is a continuation of U.S. application Ser. No. 16/833,481, filed Mar. 27, 2020, which is a divisional of U.S. application Ser. No. 16/457,780, filed Jun. 28, 2019, now U.S. Pat. No. 10,650,573, which claims the benefit of U.S. Provisional Application No. 62/692,619 filed on Jun. 29, 2018, all of which are incorporated by reference herein.

BACKGROUND

Technical Field

This application relates generally to image synthesis, and more specifically to a pixel-weighting technique for synthesizing an image corresponding to a virtual perspective.

Description of Related Art

High-performance display technology and graphics hardware enable immersive three-dimensional environments to be presented in real-time with high levels of detail. Head mounted displays (HMDs) have critical performance requirements of low latency and high frame rate to maintain immersion and prevent user discomfort resulting from discrepancies between user motion and corresponding changes of the visual field. Currently these immersive environments are primarily limited to the context of video games and simulations where the environment is rendered from a game engine with assets and textures created by artists during development. However, these environments fall short of photorealistic appearance and this virtual world paradigm does not allow for mediated interactions with the real world around the user. In applications where users interact with their physical environment, streaming of video data (often from a single imager) is used. However, the perspective and motion of the user is tied directly to that of the physical imager. Furthermore, merely overlaying information on the video stream lacks the immersion and engagement provided by a synthesized viewpoint that accurately recreates the real world, while seamlessly integrating additional information sources.

Image based or light field rendering represents a variety of techniques for synthesizing novel perspective views from sets of overlapping images of a scene. These sets of images represent a measurement of the local light field, which is described as a vector function representing the amount of light traveling in every direction through every point in the measured space. An ideal light field imager would contain pixels that record the amount of light incident on that point from all directions. Several techniques exist to densely sample the light field by capturing images of a scene from many, similar viewpoints. These conventional techniques include use of specialized imaging hardware utilizing arrays of micro or macro lenses in front of a single image sensor, a single imager undergoing smooth motion, or a large array of regularly spaced imagers. The dense sampling of the light field contains continuous, highly correlated information that is leveraged for processing. In the densely sampled case, a virtual view can be directly generated from pixel data with explicit ray correspondences between the virtual perspective and physical imagers. However, the required large volume of data poses a challenge for real-time capture, transmission, and rendering. Sparsely sampling the light field with a distributed array of imagers provides an alternative approach with data rates that are tractable by commercial hardware for real-time processing. The primary challenge under sparse capture becomes interpolation of the limited, discrete camera views. Simple schemes, such as closest ray selection, result in significant artifacts that degrade the fidelity of the rendered scene.

DETAILED DESCRIPTION

Figure 1:
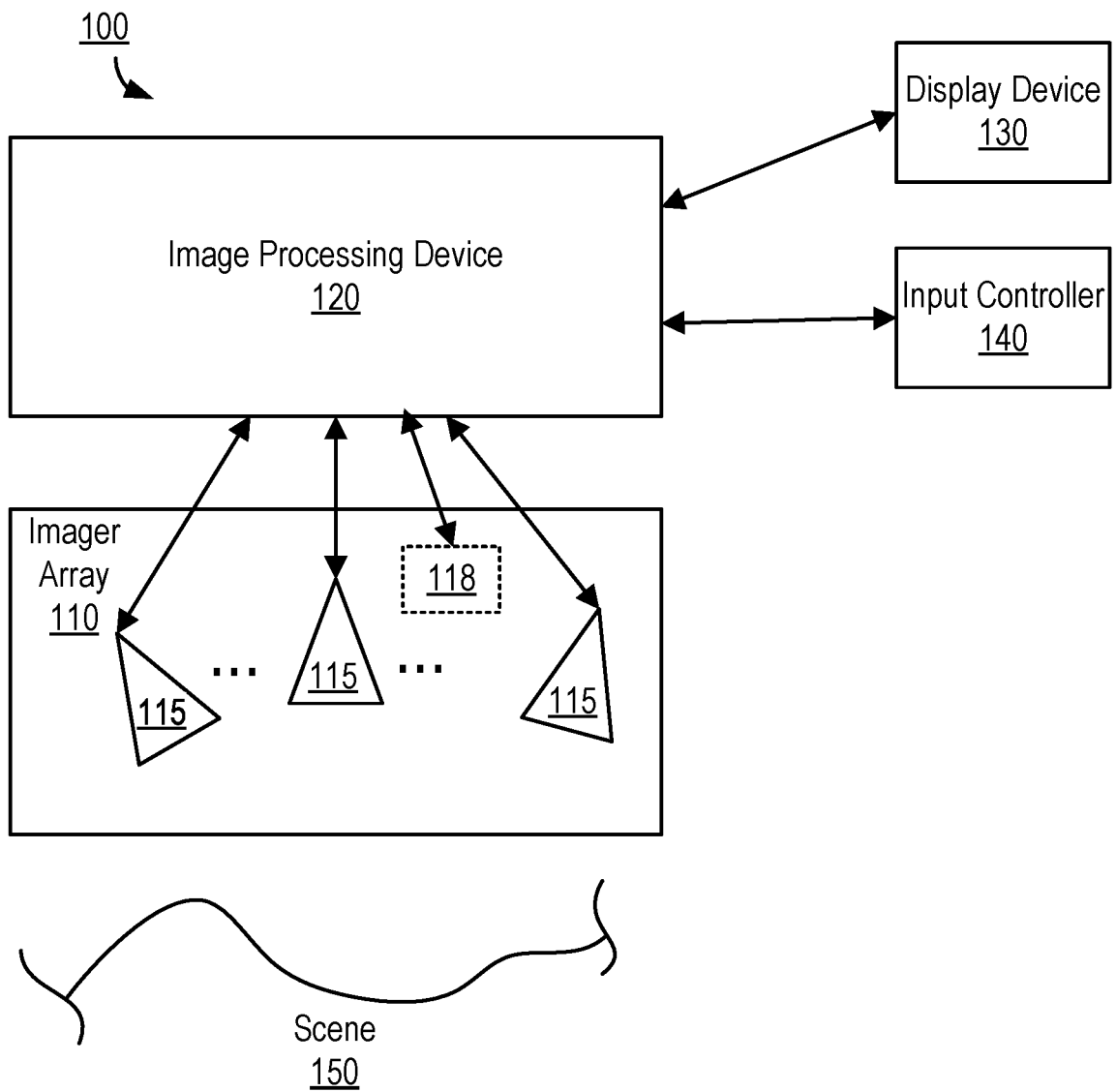
FIG. 1 is a block diagram illustrating an example embodiment of an imaging system.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A method is described for image interpolation based on pixel weighting that results in high fidelity rendered output and is suitable for real-time performance on consumer hardware. Various aspects of the described embodiments provide systems and methods for assigning weights to physical imager pixels from sparse imager views for interpolation into an arbitrary virtual perspective. One aspect identifies a series of virtual pixel locations that correspond with each physical imager pixel in the presence of geometry measurement error. For example, in a particular embodiment, a method obtains a plurality of images of a scene from respective physical images and determines an initial predicted surface geometry of the scene. Based on the predicted surface geometry, a plurality of candidate pixels from different physical images are determined that are predicted to correspond to a same world point in the scene as a virtual pixel to be computed. For each of the plurality of candidate pixels, respective sensitivities to an error in the initial predicted surface geometry are detected. Pixel weights are determined for each of the plurality of candidate pixels based on the respective sensitivities. A value for the virtual pixel may be determined based on a weighted combination of the plurality of candidate pixels using the pixel weights.

Another aspect of the described embodiments includes a function between the measurement error and virtual pixel disparity that is used to determine the respective sensitivities. An estimate of the measurement error may be found using the measurement of the corresponding world point. The world point location may be refined by maximizing the correlation between corresponding imager pixel values. A sensitivity derivative is calculated for the described function for the determined error value and corresponding world point based on the refined measurement. The sensitivity derivative may be used for calculation of an imager pixel weight using a weighting function as described above.

More specifically, in one embodiment, a virtual pixel may be computed based on the pose of a virtual viewpoint, and the scene geometry. For a given virtual pixel of the virtual viewpoint, the corresponding observed world point is determined given a camera model of the virtual perspective by defining where a ray from the center of projection through the pixel intersects scene geometry. For each physical imager, a ray is defined between its center of projection and the determined world point. This ray identifies the physical imager pixel to use for interpolation. A pixel weighting technique assigns weights that depend on uncertainty in the projected virtual pixel location due to error in the measurement of the world point location. Given a model of error in the world point location, the location of the surface is shifted by some amount along the surface normal at the point. New world points from the viewpoint of each imager are found by back-projecting along the imager rays to the intersection with the new error surface. New virtual rays are then defined between these error surface points and the virtual perspective center of projection. These virtual rays define new virtual pixel locations and the difference between these and the original virtual pixel are taken. The sensitivity of the function with respect to distance along the projecting virtual ray that relates virtual pixel disparity to geometry measurement error is evaluated at the refined depth estimate. These sensitivity values are used to weight the contribution of the corresponding imager pixels such that lower sensitivity results in higher weighting. Finally, the weighted sum of imager pixel values results in the value of the corresponding virtual pixel. This depth-aware and surface-aware interpolation method results in a synthetic view that has high accuracy and visual fidelity to the captured scene. Furthermore, the described method is capable of real-time rendering, at high frame rates (e.g., over 90 frames per second) on commercial hardware, with sparsely sampled light field data.

In an embodiment, the image synthesis technique can be applied in a mediated-reality system for surgical application. In this application, the mediated-reality system tracks the surgeon's head position and generates real-time images of the surgical site from a virtual camera perspective corresponding to the surgeon's head position to mimic the natural viewpoint of the surgeon. The mediated-reality system may overlay metadata or pre-operative images together with real-time images captured by the mediated-reality system to enhance the surgeon's ability to perform a procedure with high efficiency and precision.

DESCRIPTION OF EXAMPLE EMBODIMENTS

FIG. 1 illustrates an example system 100 for synthesizing an image corresponding to a virtual perspective. The system 100 comprises an imager array 110, an image processing device 120, a display device 130, and an input controller 140. The imager array 110 comprises a plurality of imagers 115 (e.g., cameras) that each capture images of a scene 150. The imagers 115 may be a physically arranged such that their physical locations and orientations relative to each other is fixed and known or may be automatically derived. For example, the imagers 115 may be structurally secured by a mounting structure that mounts the imagers 115 at predefined fixed locations and orientations relative to the scene 150. The imagers 115 may be positioned such that neighboring imagers 115 in the imager array 110 share overlapping views of the scene 150. The imagers 115 in the imager array 110 may furthermore be synchronized to capture images substantially simultaneously (e.g., within a threshold temporal error). The imager array 110 may also optionally include a projector 124 that projects a structured light pattern onto the scene 150. In an embodiment, the imagers 115 comprise light-field cameras that capture light field information of the scene 150, which may optionally be aided by the structured light pattern. Here, the imagers 115 capture both the intensity of light and the directions of light rays reflected from the scene 150. The light field images captured by the imagers 115 may therefore encode depth information representing a surface geometry of the scene 150.

The imagers 115 can comprise CCD or CMOS image sensors and associated optics. Optics may include a variety of configurations including lensed or bare individual image sensors in combination with larger macro lenses, micro-lens arrays, prisms, and negative lenses. In the case where multiple views of the scene 150 are incident on an individual image sensor, these sub-images may be treated as independent imagers 115 in the algorithms described below.

The image processing device 120 receives images captured by the imagers 115 of the imager array 110 and processes the images to synthesize an output image corresponding to a virtual imager perspective. Here, the output image corresponds to an approximation of an image of the scene 150 that would be captured by an imager 115 placed at an arbitrary position and orientation corresponding to the virtual imager perspective. The image processing device 120 outputs the output image corresponding to the virtual imager perspective to the display device 130 where it is displayed. The location and orientation associated with the virtual imager perspective may be controlled by an input controller 140. Furthermore, the image processing device 120 may synthesize output images corresponding to a virtual imager perspective in substantially real-time as the input controller 140 updates the location and orientation associated with the virtual imager perspective. For example, the image processing device 120 may generate output images at least as fast as a frame rate of the imager array 110 to generate an output video comprising a sequence of synthesized output images that track the virtual imager perspective in substantially real-time in response to the input controller 140.

As part of the image synthesis process, the image processing device 120 may detect the structured light projected onto the scene 150 by the projector 118 to estimate depth information of the scene and generate a depth map representing an estimated surface geometry of the scene 150. Alternatively, the projector 118 may be omitted and the image processing device 110 may derive the depth information solely from the images captured by the imagers 115 using techniques such as light field correspondence or stereo block matching. In other alternative embodiments, dedicated depth detection hardware may be utilized such as a depth camera or LiDAR detector to estimate the surface geometry of the scene 150.

In an embodiment, the image processing device 120 may perform a calibration process to detect the positions and orientation of each of the imagers 115 in three-dimensional space with respect to a shared origin and/or the amount of overlap in their respective fields of view. In one embodiment, the image processing device 120 may perform calibration by processing captured images from each of the imagers 115 of a fiducial marker placed in the scene 150 and performing an optimization over the imager parameters and distortion coefficients to minimize reprojection error for key points.

In an embodiment, the image processing device 120 calculates a depth frame for each imager 115 based on the scene geometry and imager pose information. For any given imager pixel, a ray is defined between this pixel and the imager center of projection. The value of the depth frame at a pixel location corresponds with the closest point at which this ray intersects the scene geometry, defining the distance between the imager center of projection and this world point. In the pinhole model, the color and lighting of this point corresponds directly to the pixel value in the image. Therefore, each pixel contains associated color and depth information.

In an embodiment, the image processing device 120 may furthermore processing the captured images to perform object tracking of an object within the vicinity of the scene 150. Object tracking may be performed using image processing techniques or may utilize signals from dedicated tracking hardware that may be incorporated into the imager array 110 and/or the object being tracked. In a surgical application, for example, a tracked object may comprise a surgical instrument or a hand or arm of a physician or assistant. In an embodiment, the image processing device 120 may recognize the tracked object as being separate from the surgical site of the scene 150 and may apply a visual effect to distinguish the tracked object such as, for example, highlighting the object, labeling the object, or applying a transparency to the object.

The image processing device 120 may comprise a processor and a non-transitory computer-readable storage medium that stores instructions that when executed by the processor, carry out the functions attributed to the image processing device 120 as described herein.

The display device 130 may comprise, for example, a head-mounted display device or other display device for displaying the synthesized output images received from the image processing device 120. In an embodiment, the input controller 140 and the display device 130 are integrated into a head-mounted display device and the input controller 140 comprises a motion sensor that detects position and orientation of the head-mounted display device. The virtual imager perspective can then be derived to correspond to the position and orientation of the head-mounted display device such that the virtual perspective corresponds to a perspective that would be seen by a viewer wearing the head-mounted display device. Thus, in this embodiment, the head-mounted display device can provide a real-time rendering of the scene 150 as it would be seen by an observer without the head-mounted display. Alternatively, the input controller 140 may comprise a user-controlled control device (e.g., a mouse, pointing device, handheld controller, gesture recognition controller, etc.) that enables a viewer to manually control the virtual imager perspective displayed by the display device 130.

Figure 2:
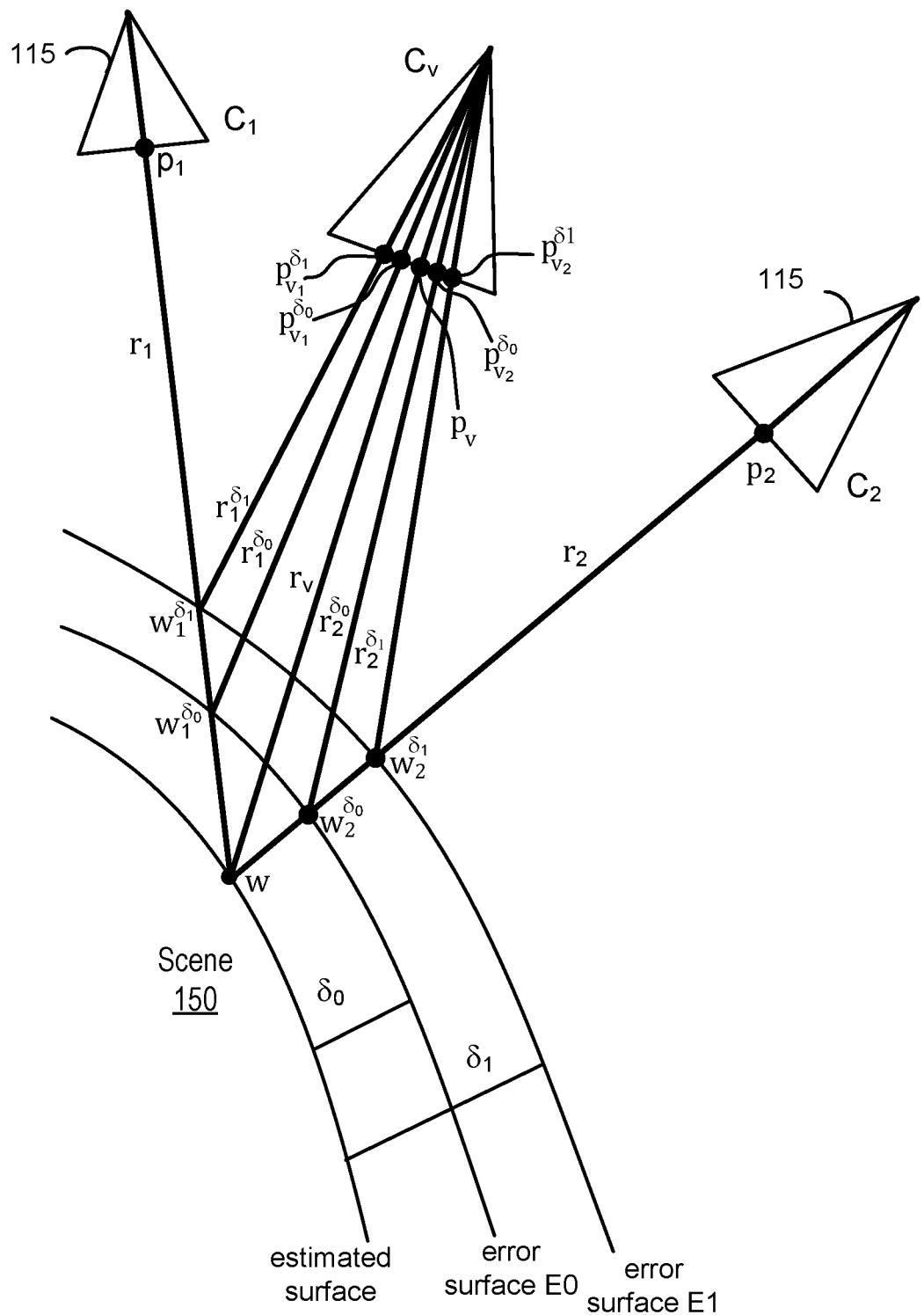
FIG. 2 is a diagram of several physical imagers and a virtual perspective that illustrates the pixels, rays, and world points used in the pixel weighting calculation.
Figure 3:
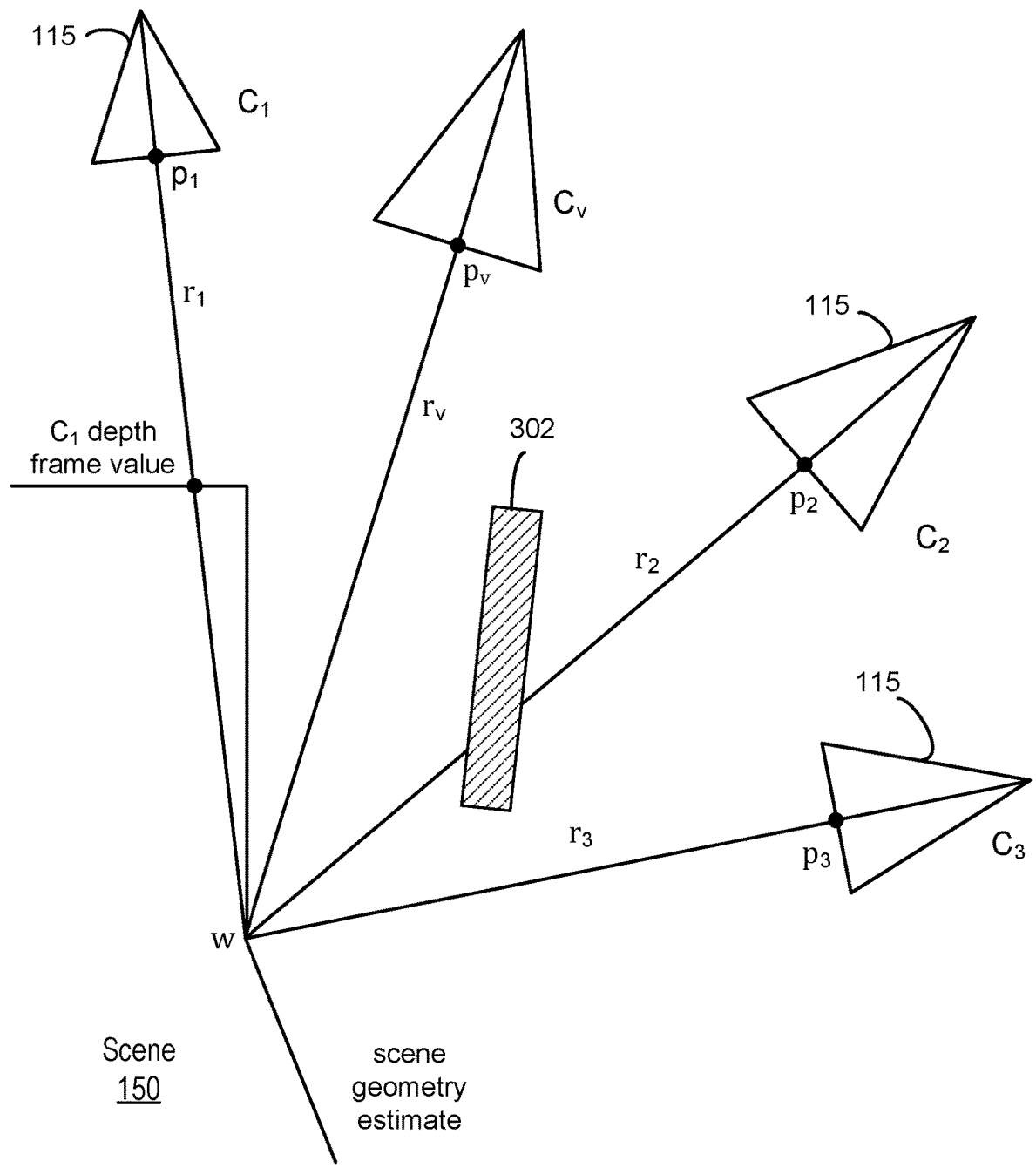
FIG. 3 is a diagram of several physical imagers and a virtual perspective illustrating the cases of obstruction and occlusion.
Figure 4:
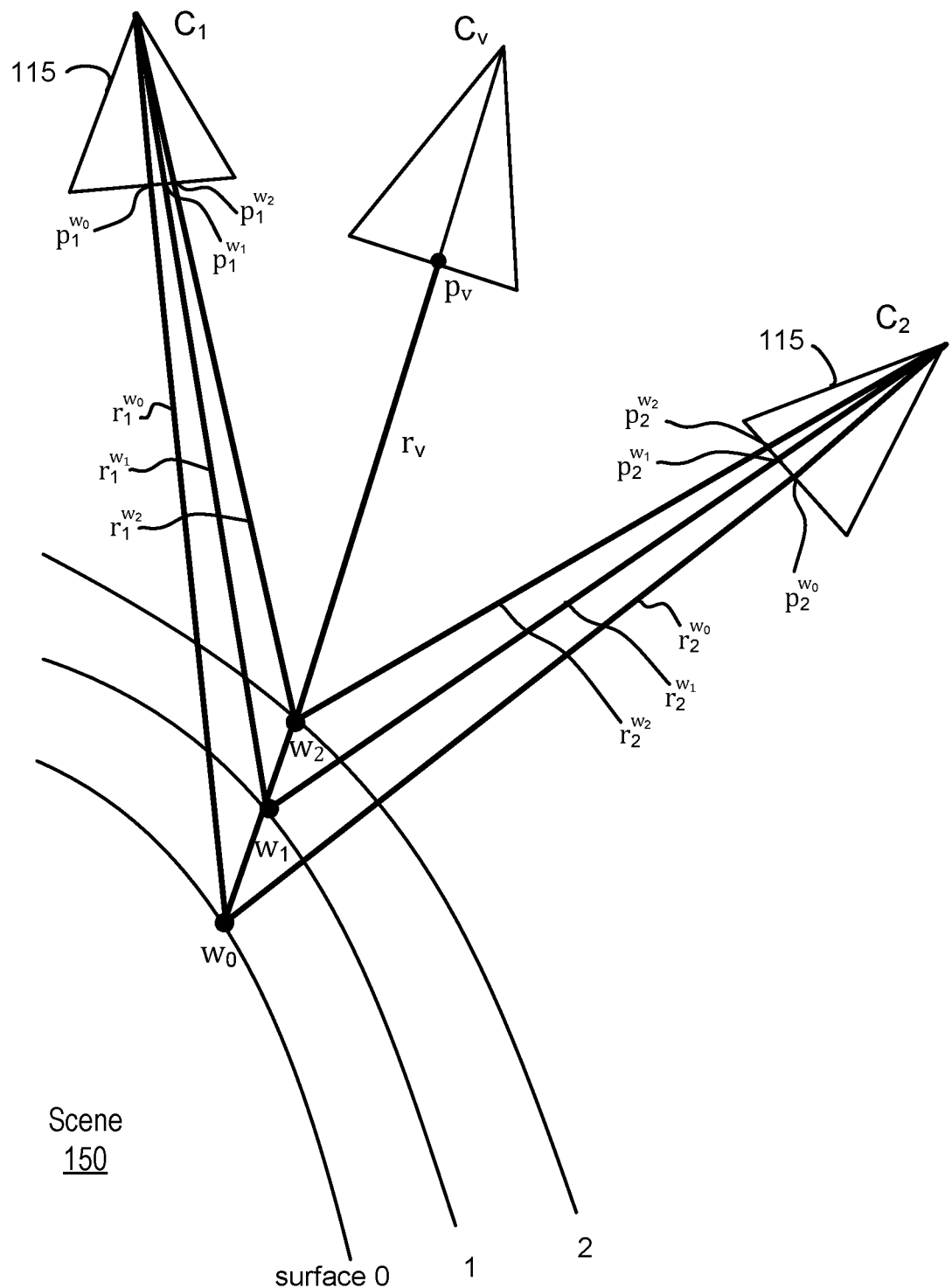
FIG. 4 is a diagram of several physical imagers and a virtual perspective that illustrates the pixels, rays, and world points used to refine a scene point depth estimate.

FIGS. 2-4 are diagrams illustrating techniques applied by the image processor device 120 to generate an output image corresponding to a virtual perspective representing a view of a virtual imager of the scene 150 from an arbitrary pose. FIG. 2 shows a typical relation between a subset of imagers 115 (e.g., imagers $C_1$ and $C_2$) and a desired virtual perspective ($C_v$). For simplicity in this example, two imagers 115 are shown, but the number is not limited to two, and in practice many more are used. For a given virtual pixel ($p_v$) of the synthesized output image (where $p_v$ refers to a location (e.g., x-y location) of the pixel within the image), a corresponding world point (w) is calculated using the virtual imager pose and the scene geometry. The world point w represents a point in the scene 150 corresponding to the virtual pixel $p_v$ based on the predicted virtual imager pose and the predicted scene geometry. A ray ($r_v$) is defined from w to the virtual perspective ($C_v$) and rays ($r_1$ and $r_2$) are defined from the same world point w to the imagers $C_1$ and $C_2$. These rays $r_1$, $r_2$ identify corresponding imager pixels $p_1$ and $p_2$, which are candidate pixels whose values $x_{p1}$, $x_{p2}$ may be interpolated to calculate the value $x_{pv}$ of $p_v$. For example, the value of $p_v$ may be calculated as a weighted combination of the values $x_{p1}$, $x_{p2}$ of $p_1$ and $p_2$. The pixel weights may be calculated as described in further detail below.

In an embodiment, the pixel weights may be computed based on characteristics of the local region around the world point w. The goal is to determine how errors in the prediction of the scene geometry affect the actual world point w seen by an imager 115. In FIG. 2, two levels of measurement error of the scene depth around the world point w are shown ($\delta_0$, $\delta_1$), but any number of levels may be considered bounded by the depth of the scene 150 or desired computational complexity. In an embodiment, a ratio of the spatial resolution of the geometry capture to that of the imagers 115 may be used to determine the number of error levels and the step size is set to the effective spatial resolution of the imagers 115. For each point in the local region of w a normal vector is calculated relative to the predicted scene geometry. This may be done by fitting a local plane to each point. Alternatively, globally consistent normal values can be determined by propagation as part of scene geometry acquisition. Another embodiment explicitly represents the scene geometry as a function, where the normal at any point is given by the gradient. In an embodiment, dot product between the point normal and the camera ray is checked and the point is considered in the pixel weighting calculation only when the dot product is above a certain threshold to avoid contributions from points that correspond to edges or back faces. The points in the local region around w are then translated by the step size along their normal vector to form respective candidate error surfaces 202 (e.g., error surfaces E0 and E1), which may be fit with a Nth order polynomial, where the order is bounded by the desired accuracy.

Given an error surface E and a camera ray r for a given imager 115, the candidate points the imager 115 would see given this error level are found as the intersection of the ray r and the fit error surface E. For example, for camera $r_1$ for imager $C_1$ the error point for error surface E0 is $w_1^{\delta_0}$ and the error point for error surface E1 is $w_1^{\delta_1}$. New error rays between the virtual perspective $C_v$ and these points are $r_1^{\delta_0}$ and $r_1^{\delta_1}$ respectively for error surface E0 and E1. These error rays $r_1^{\delta_0}$ and $r_1^{\delta_1}$ intersect virtual pixel locations $p_v^{\delta_0}$ and $p_v^{\delta_1}$. Thus, the surface estimation error results in virtual pixels $p_v$ that correspond to different pixels p of the actual imagers 115 than otherwise expected for an accurate surface estimation. The difference between each of these virtual pixel locations $p_v^{\delta_0}$ and $p_v^{\delta_1}$ due to the error surface and the original virtual pixel $p_v$ are calculated as follows:

$$e_0 = p_{v_1}^{\delta_0} - p_v$$

$$e_1 = p_{v_1}^{\delta_1} - p_v$$

where $e_i$ is a distance error in the virtual pixel position corresponding to a physical imager pixel resulting from a particular depth estimation error. The relation between virtual pixel error e and level of depth measurement error $\delta$ (e.g., [$(\delta_0, e_0), (\delta_1, e_1)$]) is fit with a Nth order polynomial function such that $e=f(\delta)$. Thus, the virtual pixel error function $f$ maps a particular depth measurement error to the resulting virtual pixel error. The sensitivity of the virtual pixel error function with respect to error is found by evaluating the derivative. The pixel weight is a function of this sensitivity value. In one embodiment, the sensitivity derivative is evaluated at an error level that maximizes relevant pixel correlation, $\delta_{correlation}$:

$$s = \frac{df}{d\delta}\bigg|_{\delta_{correlation}}$$

where s is the sensitivity. A process for determining $\delta_{\delta_{correlation}}$ is described in further detail below with respect to FIG. 4.

The imager pixel weight is calculated as a piece-wise function of the sensitivity s. For example, in an embodiment, the imager pixel weight is computed as follows:

$$c = \begin{cases} g(s), & s < \text{uncertainty threshold} \\ k, & s > \text{uncertainty threshold} \\ 0, & \text{obstructed or occluded} \end{cases}$$

where the uncertainty threshold may be a predefined value and where k is a predefined constant. In an embodiment, the weights c associated with each imager 115 are normalized (e.g., by applying a normalizing factor) such that all the weights c add up to 1 for a given $p_v$. In one embodiment, $g(s)$ is chosen to be a radial basis function such that the weighted sum is dominated by the imager pixel with lowest sensitivity. The constant region k above the uncertainty threshold ensures that even in cases where the virtual view is at a large angular displacement from any physical imagers, a view is still rendered. In an embodiment, these high uncertainty regions are presented on the display device 130 with lower brightness or other visual demarcation to provide a visual cue to the high uncertainty. As discussed above, imagers 115 that are obstructed or occluded from the scene point do not contribute to the final pixel value $x_{pv}$ and thus receive a zero weight. In the provided example of FIG. 2 with two imagers $C_1$, $C_2$, the pixel value $x_{pv}$ virtual pixel $p_v$ corresponding to a world point w may be computed as:

$$x_{pv} = n \ (c_1 d_1 x_{p1} + c_2 d_2 p x_{p2})$$

where $x_{pv}$ is the virtual pixel value, n is the normalizing factor, $c_n$ is the nth imager pixel weight, $d_n$ is the nth imager pixel fade, and $x_{pn}$ is the imager pixel value. The pixel fade $d_n$ is calculated as:

$$d = f(\text{pixel}_x, \text{pixel}_y, \text{image}_{width}, \text{image}_{height})$$

where $\text{pixel}_x$ represents the x-coordinate of the pixel p, $\text{pixel}_y$ represents the y-coordinate of the pixel p, $\text{image}_{width}$ represents an overall width of the imager image, and $\text{image}_{height}$ represents the overall height of an imager image. Thus, d is smaller the closer the pixel is to the edge of the image. This fade term reduces discrete boundaries from appearing in the interpolated view due to variation in the imager properties such as white balance and vignetting.

A result of the above described technique is that the pixel weights are weighted based on the sensitivity to depth estimation error of a particular virtual pixel's correspondence to an imager pixel. In FIG. 2, for example, even though $r_1$ has a smaller angular displacement from than $r_2$, $p_1$ has a lower weight than $p_2$ because it has a higher error sensitivity due to the relation between the surface geometry, imager locations, and virtual perspective.

FIG. 3 illustrates examples of scenarios in which the weights of the imager pixels $p_1$ and $p_2$ may be set to zero, making no contribution to the pixel value $x_{pv}$ of pixel $p_v$. In FIG. 3, the view of the world point w by imager $C_1$ is obstructed by the scene geometry. Furthermore, the view of the world point w by imager $C_2$ is occluded by an object 302 from outside the scene 150. For example, the object 302 may correspond to a surgical tool positioned between the imager array 110 and a surgical site corresponding to the scene 150. In one embodiment, the image processing device 120 detects obstruction by comparing the z coordinate of the world point w in the imager's perspective based on the scene geometry to the value of the depth frame for the expected corresponding pixel $p_1$ captured by the imager $C_1$. If a mismatch is detected, the image processing device 120 may detect that world point w is occluded from the view of the imager $C_1$ and set a weight associated with the contribution of the pixel value $x_{p1}$ pixel $p_1$ to the pixel value pixel value $x_{pv}$ of virtual pixel $p_v$ to zero.

In another embodiment the image processing device 120 may determine a radiometric correspondence between imager pixels that are expected, based on the scene geometry and imager poses, to share a common world point w, such as imager pixels $p_1$ and $p_3$. For example, one or more outlier pixels may be detected that has a below threshold correspondence in its pixel value with a majority of other pixels mapping to the same world point w. The one or more outlier pixels may be detected as corresponding as representing an occluding object between the imager and the world point w.

In other embodiments that utilize separate depth capture hardware, hand tracking, or tool tracking, occlusion may be detected by checking if the imager rays (e.g., $r_2$ or $r_3$) intersect a position of a tracked asset or a portion of the depth map that is discontinuous from the majority of the scene 150.

FIG. 4 illustrates an example of a technique for determining the depth estimation error level $\delta_{\delta_{correlation}}$, that maximizes pixel correspondence as used in the pixel weighting calculation described above. Here, a series of world points are identified at the intersection of each surface and $r_v$, shown in FIG. 4 as $w_0$, $w_1$, $w_2$. Rays between those points and the imagers identify a series of pixels, one per error level. For imager $C_1$ the rays $r_1^{w_0}$, $r_1^{w_1}$, $r_1^{w_2}$ correspond to pixels $p_1^{w_0}$, $p_1^{w_1}$, $p_1^{w_2}$ respectively. $\delta_{correlation}$ is the surface that results in the maximum imager pixel correlation, such as between the pixel values of $p_1^{w_0}$ and $p_2^{w_0}$. The level that maximizes pixel correlation is a refined estimate of the true surface position. In one embodiment, the effective spatial resolution of the imagers is higher than that of the depth capture modality. In that case, the refined depth value can update the estimated value as well as upsample the resolution of the scene geometry.

Figure 5:
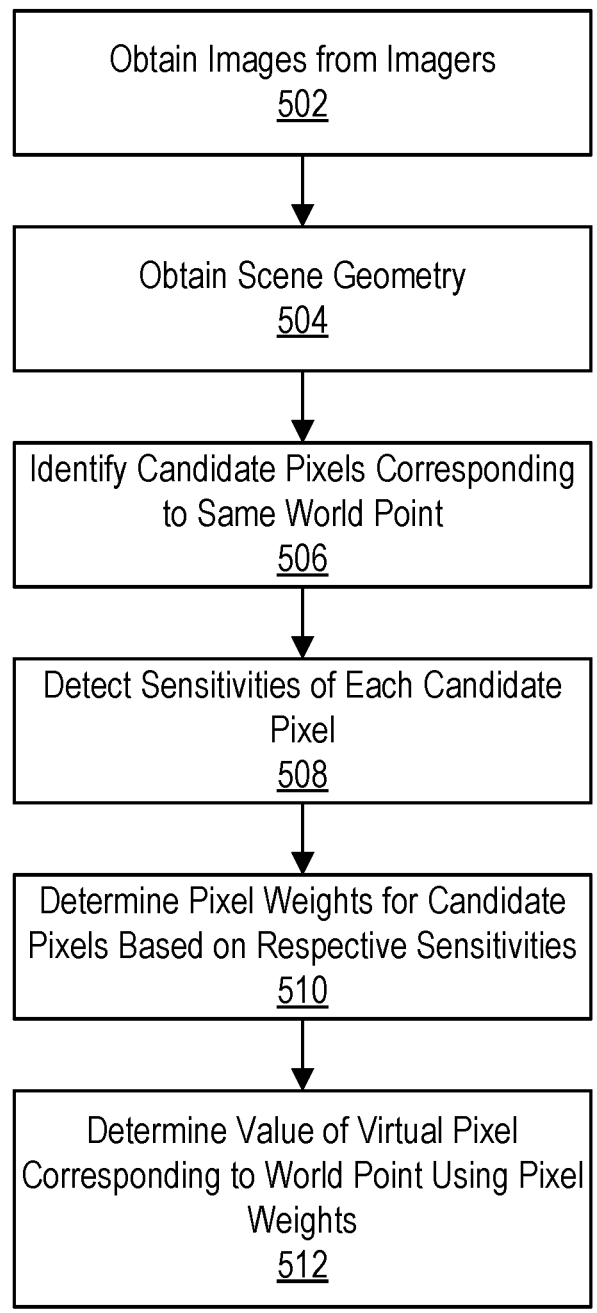
FIG. 5 is a flowchart illustrating a process for synthesizing a virtual pixel value from physical imager pixels.

FIG. 5 is a flowchart illustrating an example embodiment of a process performed by the image processing device 120 to generate a synthesized image corresponding to a virtual perspective. The image processing device 120 obtains 502 image from each of the imagers 115. The image processing device 120 furthermore obtains 504 the scene geometry representing depth estimates of the scene. The image processing device 120 may furthermore obtain other information such as the poses of each of the physical imagers 115 (e.g., positions and orientations) in the image array 110. In an embodiment, the image processing device 120 is calibrated such that these quantities are obtained in a unified coordinate system. The image processing device 120 then identifies a plurality of candidate pixels that may contribute to the virtual pixel value. For example, a world point may be identified for a virtual pixel to be computed (based on the virtual perspective and the scene geometry). The candidate pixels may be identified based on the poses of the physical imagers 115 and the scene geometry as pixels corresponding to the same world point. In an embodiment, rays from the world point to each of the physical imagers 115 may be identified to determine one candidate pixel per physical imager 115. Sensitivities of each of the candidate pixels to errors in the estimated scene geometry are determined 510. Here, a low sensitivity generally indicates that an error in the depth estimate around the world point will have a relatively small effect on the virtual pixel location corresponding to the world point represented by the candidate pixel. A high sensitivity generally indicates that an error in the depth estimate around the world point will have a significant effect on the virtual pixel location corresponding to the world point represented by the candidate pixel.

Pixel weights are then determined 510 for each candidate pixel based on their respective sensitivities. In an embodiment, the weights are calculated using a piece-wise continuous function. For example, if the sensitivity is below a given uncertainty threshold, the weight is calculated from a radial basis function, whereas if it is below the threshold the weight is a small constant value. A normalization factor is then calculated such that the weights sum to one.

In an embodiment, determining 510 the pixel weights may further include identifying candidate pixels that are obstructed or occluded from view of the world point. Candidate pixels that are obstructed or occluded are assigned a weight of zero such that they do not contribute to the virtual pixel value.

The value of the virtual pixel is then determined 512 using the pixel weights. For example, the virtual pixel value may be calculated using the physical imager pixel values, weights, fades, and the normalization factor.

The process of FIG. 5 generally iterates over every virtual pixel to be rendered, thereby determining a pixel value at each iteration until pixel values for the entire output image are determined.

Figure 6:
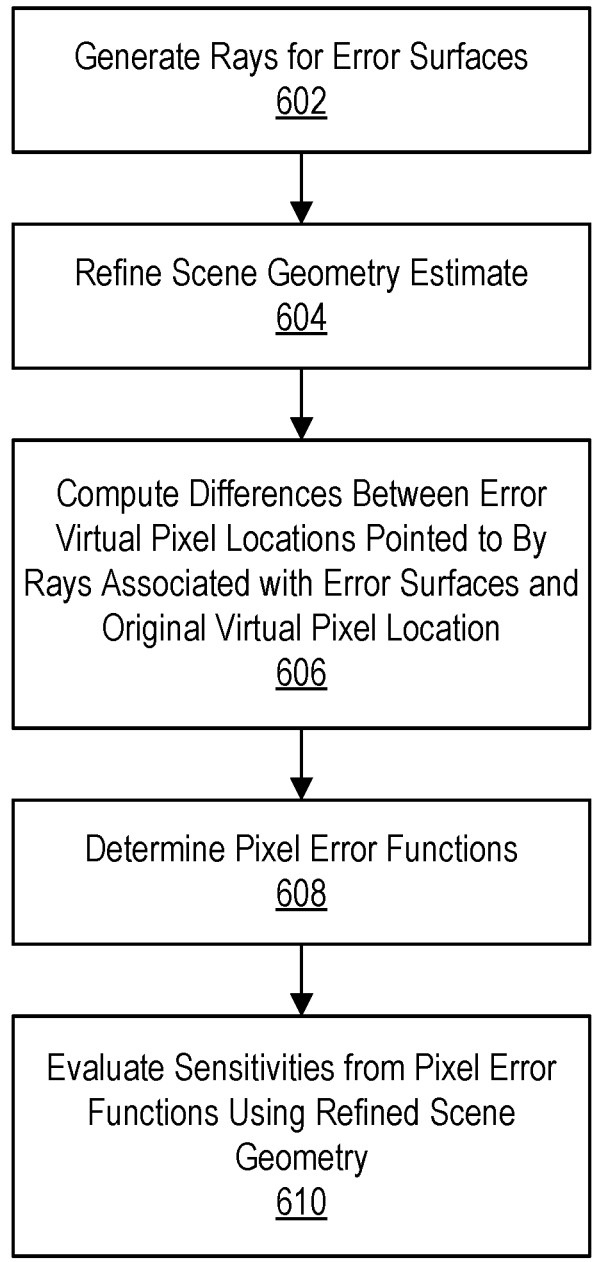
FIG. 6 is a flowchart illustrating a process for computing pixel weights for imager pixels for contributing to synthesis of a virtual pixel of an output image corresponding to a virtual perspective.

FIG. 6 illustrates an embodiment of a process for detecting 508 the sensitivities of each candidate pixel. A set of rays are generated 602 for a series of error surfaces corresponding to the virtual perspective and the physical imagers 115. For example, error surfaces may first be determined at different fixed distances from the estimated surface geometry. The intersection points between these error surfaces and the imager rays are determined. New virtual rays are defined between these intersection points and the virtual perspective and new imager rays are defined between the intersection points and the imagers 115. In an embodiment, surface normals for a region of relevant world points about the original world point are determined from the scene geometry and used to calculate the multi-dimensional error surfaces. This calculation can be performed using local information or in a globally consistent manner using information from the entire scene.

The surface geometry estimate is then refined 604 based on the rays for the error surfaces. For example, the intersection points between the error surfaces and the virtual ray identify a series of points corresponding to a series of physical imager pixels. For each intersection point, the correspondence between relevant physical imager pixels is computed. The intersection point that maximizes correspondence between imager pixels is a refined estimate of the scene geometry at the world point. The refined depth value may be used to refine and upsample the scene geometry used in the pixel weighting process of FIG. 5.

Differences are then computed 606 between the original virtual pixel and error virtual pixels pointed to by rays associated with the error surfaces. For example, intersection points between the error surfaces and imagers are used to define rays to the virtual perspective, which identify a series of virtual pixels. The difference between these virtual pixel positions and the original virtual pixel position is calculated for each imager 115. Each error surface is characterized by its displacement from the original world point. A pixel error function is determined 608 relating the virtual pixel positional error to the displacement for each imager 115.

The sensitivity of the pixel error function is evaluated 610 for each imager 115. In one embodiment, this sensitivity is calculated as the derivative of the pixel error function with respect to displacement at the value of displacement given by the difference between the refined scene geometry and original geometry measurement.

Figure 7:
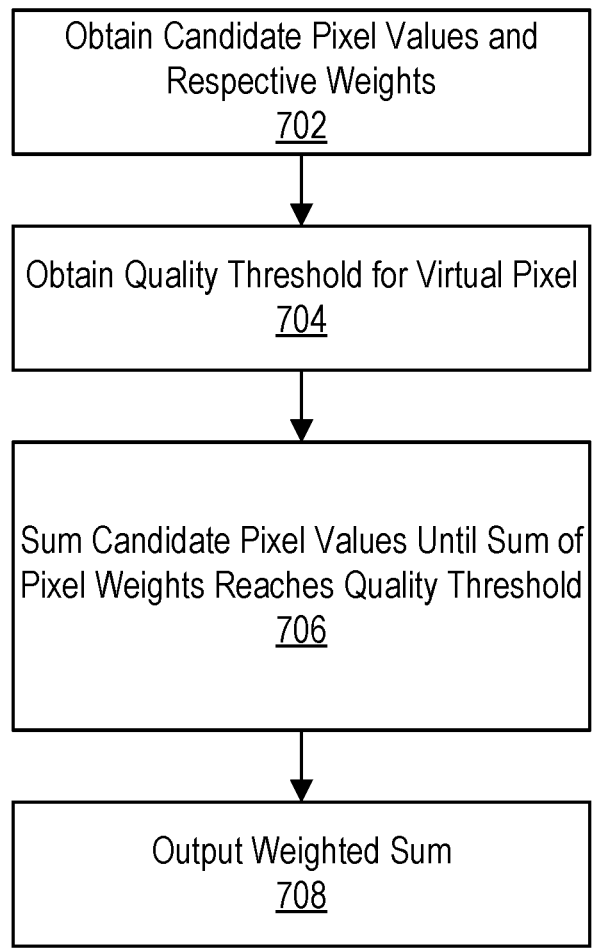
FIG. 7 is a flowchart illustrating a process for determining a value of a virtual pixel of an output image corresponding to a virtual perspective based on a quality threshold.

FIG. 7 illustrates an embodiment of a process for determining 512 the value of the virtual pixel using the pixel weights. In this embodiment, a subset of candidate pixels from the imagers 115 may be selected to contribute to the pixel value of a given virtual pixel, that does not necessarily include all of the candidate pixels. Here, the image processing device 120 obtains 702 the candidate pixel values and respective weights corresponding to a virtual pixel for rendering. The image processing device 120 also obtains 704 a quality threshold for the virtual pixel. The quality threshold may comprise a static predefined value or a value that is dynamically updated. Furthermore, the quality threshold may be dependent on the pixel location of the virtual pixel as described in further detail below. The imager pixel value for the candidate pixels are then summed 706 in order of decreasing weight until the sum of the pixel weights reaches the quality threshold. For example, if the quality threshold is set to 70%, candidate pixel values are added until a pixel weight sum of 0.7 is reached and the weighted sum is outputted 708. Using fewer than all of the candidate pixels may improve rendering performance by reducing the number of imager pixels interpolated per virtual pixel, by reducing image memory access. Furthermore, fewer imager pixels being utilized can decrease image download time via region-of-interest selection as described below.

In an embodiment, the quality level thresholds are defined separately for different virtual pixels. Here, a weight map can be defined for a virtual perspective, such that every virtual pixel has a corresponding quality value. This map can be selected in many ways including uniform, spatially varying, or dependent on the user's level of engagement or focus (e.g., by setting higher thresholds for areas where the viewer is focused). A uniform level can be appropriate for scaling the computational requirements of rendering for different hardware platforms. Spatially varying, such as decreasing from the center of the display towards the edges, can focus attention of the user or reduce peripheral motion during translation of the perspective. In one embodiment, the user's focus is captured with an eye tracker. An example of weighting based on user engagement is that as a user interacts with a visual menu the quality of the rendered scene is decreased. In another case, weight maps are dynamically generated based on the center of focus of the eye, the foveal position, and the falloff in visual acuity about this region. In this case, pixels corresponding with the user's foveal view are given 100% quality, while other pixels are assigned a weight based on user's visual acuity at these points. Visual acuity maps from the medical literature may be used or such a map can be uniquely determined for the user during a calibration routine.

In an embodiment, the pixel weighting algorithm may balance tradeoffs between image quality and effective frame rate. Particularly, the pixel weighting algorithm can determine selected pixels to download to the display device 130 for display, without necessarily downloading all of the pixels, thereby significantly decreasing download time and increasing application frame rates. In this embodiment, instead of directly using the pixel weights for interpolation as described above, the pixel weights are instead stored in a weight frame. The weight frame is the same resolution as the captured images and each pixel value consists of a list of calculated weights. The weight frame is initialized to zero such that image pixels that are not referenced in the weighting calculation unit have zero weight. For illustrative purposes, consider a simple scheme where only the maximum weight is stored for an individual pixel. In this case, the weight frame has a single value per pixel, which is the maximum weight assigned to that pixel for all virtual pixels considered. Other techniques may alternatively be used to calculate the weight frame data structure. In one embodiment, only pixels with non-zero value are downloaded from the image processing device 120.

In another embodiment, the imager 115 does not support streaming of individual pixels, but regions or macro-blocks of the image may be individually downloaded. In this case an algorithm, such as sliding window average, can be used to assign weights to image macro-blocks and only blocks with a combined weight above a threshold will be downloaded from the image processing device 120 for display by the display device 130. In other embodiments, the image processing device 120 determines on a frame-by-frame basis whether or not to send the entire image frame to the display device 130. Here, a calculation based on the entire weight frame can be used for this determination. Furthermore, some combination of the above-described schemes may be used given different thresholds for pixels, macro-blocks, or whole imagers based on the performance of the hardware and desired rendered output quality.

In another embodiment, the above described technique using the weight frame can be combined with the quality threshold technique described above. Here, the image processing device 120 can directly set the weight frame values of pixels that are not used for rendering at a given quality level to zero. Alternatively, various threshold values can be calculated for a given quality level such that pixels, macro-blocks, or entire images below their respective threshold are not downloaded.

There are several approaches for temporally implementing the above-described. The weighting frame may be calculated at the start of an application loop, then used for selective image download, and finally perspective rendered. In this case, the depth frame structure may allow weights to be queried based on their virtual pixel correspondence so that weights are not re-calculated during rendering. Predictive approaches may use weight frames from a previous application loop directly or calculate a weight frame from a series of previous frames and a model of the user or perspective motion. The weight frame can be based on virtual pixels for a single virtual perspective or many virtual perspectives that may have different size, resolution, and quality requirements.

The described embodiments can be applied to a variety of imager layouts with imager poses, rays, and scene surface geometry in three-dimensional space. The presented algorithms are furthermore applicable to any number of imagers. For example, the described embodiments enable rendering of multiple pairs of stereoscopic virtual perspectives in real-time on commercially available hardware using between 10 and 20 high-resolution cameras running at 60 frames per second. In alternative embodiments, different numbers of cameras, different frame rates, or customized imagers may be used. Additionally, the methods can apply to calculating weights based on an approximation of the probabilistic motion of light ray paths through the scene with imager pixels treated as discrete point or using a more general model that accounts for projection of each pixel's solid angle into the scene in order to encompass a distribution of world points. The described embodiments encompass the use of world point distributions, generalizing the algorithms to act on probability distributions.

Further still, the described embodiments may apply to a homogeneous collection of imagers with similar resolution and optical properties or to heterogeneous collections of imagers with different resolutions and/or optical properties. One such heterogeneous embodiment utilizes imagers with increasing focal length towards the center of the imager array. In this case, refinement of the depth estimate occurs in similar imager groupings from lowest effective spatial resolution to highest, where the lower resolution estimate is used to bound the range of error surfaces for the next imager grouping. Furthermore, sub-pixel sampling methods and super-resolution imaging techniques may be used to interpolate pixels from heterogeneous imagers.

An example application of the described embodiments is rendering a pair of virtual perspectives with stereoscopic proportion on a display device to present an immersive, three-dimensional environment. This stereoscopic perspective can be delivered to the user through a variety of technologies including, but not limited to, a three-dimensional capable monitor or head mounted display. While the described invention can be used to present fully real environments, the captured images can also be transformed in many ways, seamlessly enhanced with additional information streams, and transmitted to a variety of users or mediums. For example, views may be rendered in a divided way to enable a user to simultaneously view multiple different virtual perspectives of the scene 150. The physical relation between the user and the space can also be modified so that the virtual perspective does not necessarily correspond to the viewer's head position. For example, the interpupillary distance between the stereoscopic views can be decreased such that the user shrinks in relation to the scene. The effect of this is to provide a high-quality, magnified view of a portion of the scene to the user. Enhancement of the scene information may present the user with sharper detail, larger depth of field, enhanced wavelength sensitivity, or broader spectrum visibility than is possible with their own vision. Additional enhancements include measurement, labeling, or segmentation. Segmentation can be used to highlight or provide information on salient portions of the scene or detected objects. Such physical objects can have an aligned digital representation that changes their appearance in order to provide additional information or customize the user experience. Furthermore, fully digital assets can also be added such as virtual displays, drawings or annotations, and models. These models can be full synthesized such as by a team of artists. Alternatively, they can represent real world objects or data such as a CAD model or clinical data from magnetic resonance imaging. In this way, the distinction between real and virtual becomes nonspecific and the system is most accurately described as a medium for integrating and transmitting information to the user. Furthermore, capture and presentation of the information becomes decoupled.

The described embodiments can also enable a remote user to view a virtual perspective of the scene from any distance (e.g., by transmitting the rendered images to a remote display device 130). Furthermore, any number or combination of co-located and remote users can interact with the scene simultaneously. The scene data may also be saved to a medium, allowing for viewing a snapshot or video of the scene at a later time.

A particular example application of the described embodiments is for performance of surgery. In this case, a co-located user wearing a head-mounted display device 130 operates on a portion of the body (corresponding to the scene 150) captured by the imager array 110. The captured scene 115 may furthermore include the surgeon's hands, tracked tools, surgical site, and peripheral body portions. The ergonomics for the surgeon are improved by decoupling of scene capture and presentation. Instead of looking down at the patient or through an optical microscope, the surgeon can gaze forward naturally while viewing the surgical site with the best possible perspective. The surgeon can seamlessly magnify the scene as needed without switching between or adjust optical magnification hardware that limits their field of view and depth of focus. Pre-operative volumetric data such as computed tomography or magnetic resonance imaging may furthermore be aligned and overlaid on the visual representation of the surgical site allowing the surgeon to see under the surface of the tissue to structures that are not yet directly visible by the imager array. Furthermore, pre-operative surgical plans including tool trajectories, hardware placement locations, and insertion depths may be overlaid and displayed to the surgeon via the display device 130.

The surgeon's hands or tools may furthermore be tracked using object tracking techniques to display measurements of position or to provide closed-loop feedback in the form of deviations from the planned trajectory. The hands may be displayed as fully real, colored, or stylized based on surgeon preference. Furthermore, due to the multitude of imager views, the hands may be shown with opacity or fully removed from the rendered view to enhance the visibility of the surgical site. Similarly, the tools can be stylized with only the relevant portions, such as knife edge, being shown. Other relevant data to the surgeon, such as the patient vitals, is presented in their view as a heads-up display. The surgeon's environment can seamlessly integrate the natural appearance of their surroundings, the enhanced perspective on the surgical site, as well as information overlays. The salience of these data streams can be modified by user preference, relevance during the time course of the procedure, or measured user engagement.

In further embodiments, the surgical application can include one or more remote viewers that view the representation of the scene via remote display device 130. For example, other members of the surgical team that are directly involved in the surgery, passive observers, and active observers may all view renderings of the scene 150. Each individual remote user may take the perspective of surgeon or their own unique perspective, with any level of enhanced information that is relevant to them directly. Passive users can be medical students in training that are physically present in the operating room. Currently these students may get a single camera feed of the surgical site on a monitor present in the room. The described system provides an immersive perspective for them to view what the surgeon is doing. Other passive observers may be students or doctors interested in a specific procedure in other hospitals around the world. Active observers can be remote experts who provide expertise to the surgeon during specific portions of the surgery regardless of their physical location.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules or engines, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium storing instructions including computer program code, which can be executed by a computer processor for performing any or all of the steps, operations, or processes described. Furthermore, any computing systems referred to in the specification may include a single processor or may be architectures employing multiple processor designs for increased computing capability.

Upon reading this disclosure, those of skill in the art will appreciate still additional alternative structural and functional designs for the disclosed embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and system disclosed herein without departing from the scope of the described embodiments.

The invention claimed is:

1. A method comprising:
    determining, for a virtual pixel of an image corresponding to a virtual perspective of a scene based on an initial predicted surface geometry of the scene, a plurality of candidate pixels from different physical imagers that are predicted to correspond to a same world point in the scene as the virtual pixel;
    determining pixel weights for each of the plurality of candidate pixels based on respective sensitivities of each of the plurality of candidate pixels to an error in the initial predicted surface geometry; and
    determining a value for the virtual pixel based on a weighted combination of the plurality of candidate pixels using the pixel weights.

2. The method of claim 1, further comprising:
    obtaining a plurality of images of the scene from respective physical imagers of the different physical imagers; and
    determining the initial predicted surface geometry of the scene.

3. The method of claim 1, where determining the initial predicted surface geometry of the scene comprises:
    estimating an initial surface geometry of the scene;
    for a plurality of error levels relative to the initial surface geometry, determining sets of respective error pixel values from the plurality of physical imagers corresponding to common world points on respective error surfaces based on the plurality of error levels;
    determining respective correspondence measures between the sets of respective error pixel values;
    selecting an error level corresponding to a maximum one of the respective correspondence measures; and
    refining the initial surface geometry based on the selected error level.

4. The method of claim 1, further comprising:
    detecting for each of the plurality of candidate pixels, respective sensitivities to an error in the initial predicted surface geometry, wherein detecting the respective sensitivities comprises:
        determining a plurality of error surfaces corresponding to different depth errors in the geometry of the scene;
        for a given candidate pixel, determining a depth error sensitivity function mapping the different depth errors to respective changes in a virtual pixel location that corresponds to the given candidate pixel; and
        determining a sensitivity of the given candidate pixel based on a derivative of the depth error sensitivity function.

5. The method of claim 1, wherein determining the pixel weights comprises:
    detecting an occlusion associated with a given candidate pixel of the plurality of candidate pixels; and
    setting a pixel weight associated with the given candidate pixel to zero in response to detecting the occlusion.

6. The method of claim 5, wherein detecting the occlusion comprises:
    detecting a pixel correspondence anomaly associated with the given candidate pixel relative to other candidate pixels of the plurality of candidate pixels; and
    detecting the occlusion in response to detecting the pixel correspondence anomaly.

7. The method of claim 1, wherein determining the pixel weights comprises:
    for a given candidate pixel of the plurality of candidate pixels, determining if a function of a sensitivity for the given candidate pixel exceeds a threshold; and
    responsive to the function of the sensitivity not exceeding the threshold, assigning to function of the sensitivity as a pixel weight for the given candidate pixel.

8. The method of claim 1, wherein determining the pixel weights comprises:
    for a given candidate pixel of the plurality of candidate pixels, determining if a function of a sensitivity for the given candidate pixel exceeds a threshold; and
    responsive to the function of the sensitivity exceeding the threshold, assigning a constant value as a pixel weight for the given candidate pixel.

9. The method of claim 1, wherein determining the value for the virtual pixel based on the weighted combination of the plurality of candidate pixels using the pixel weights comprises:
    obtaining a quality threshold for the virtual pixel;
    identifying a minimum subset of the candidate pixels such that when corresponding pixel weights are added in order of decreasing weight meet or exceed the quality threshold; and
    determining the value for the virtual pixel as a weighted combination of the minimum subset of the candidate pixels.

10. A non-transitory computer-readable storage medium comprising stored instructions, the instructions when executed by a processor of a device, causing the device to:
    determine, for a virtual pixel of an image corresponding to a virtual perspective of a scene based on an initial predicted surface geometry of the scene, a plurality of candidate pixels from different physical imagers that are predicted to correspond to a same world point in the scene as the virtual pixel;
    determine pixel weights for each of the plurality of candidate pixels based on respective sensitivities of each of the plurality of candidate pixels to an error in the initial predicted surface geometry; and
    determine a value for the virtual pixel based on a weighted combination of the plurality of candidate pixels using the pixel weights.

11. The non-transitory computer-readable storage medium of claim 10, further comprising stored instruction that when executed causes the processor to:
    obtain a plurality of images of the scene from respective physical imagers of the different physical imagers; and
    determine the initial predicted surface geometry of the scene.

12. The non-transitory computer-readable storage medium of claim 10, where the stored instructions to determine the initial predicted surface geometry of the scene further comprises stored instruction that when executed causes the processor to:
    estimate an initial surface geometry of the scene;
    determine, for a plurality of error levels relative to the initial surface geometry, sets of respective error pixel values from the plurality of physical imagers corresponding to common world points on respective error surfaces based on the plurality of error levels;
    determine respective correspondence measures between the sets of respective error pixel values;
    select an error level corresponding to a maximum one of the respective correspondence measures; and
    refine the initial surface geometry based on the selected error level.

13. The non-transitory computer-readable storage medium of claim 10, further comprising stored instructions that when executed causes the processor to:
   detect for each of the plurality of candidate pixels, respective sensitivities to an error in the initial predicted surface geometry, wherein detection of the respective sensitivities further comprises stored instructions to:
      determine a plurality of error surfaces corresponding to different depth errors in the geometry of the scene;
      determine, for a given candidate pixel, a depth error sensitivity function mapping the different depth errors to respective changes in a virtual pixel location that corresponds to the given candidate pixel; and
      determine a sensitivity of the given candidate pixel based on a derivative of the depth error sensitivity function.

14. The non-transitory computer-readable storage medium of claim 10, wherein the stored instructions to determine the pixel weights further comprises stored instructions that when executed causes the processor to:
   detect an occlusion associated with a given candidate pixel of the plurality of candidate pixels; and
   set a pixel weight associated with the given candidate pixel to zero in response to detecting the occlusion.

15. The non-transitory computer-readable storage medium of claim 14, wherein the stored instructions to detect the occlusion further comprises stored instructions that when executed causes the processor to:
   detect a pixel correspondence anomaly associated with the given candidate pixel relative to other candidate pixels of the plurality of candidate pixels; and
   detect the occlusion in response to detecting the pixel correspondence anomaly.

16. The non-transitory computer-readable storage medium of claim 14, wherein the stored instructions to detect the occlusion further comprises stored instructions that when executed causes the processor to:
   perform an object tracking of an object in a vicinity of the scene; and
   detect the occlusion in response to a location of the object intersecting a ray between a physical imager and the scene.

17. The non-transitory computer-readable storage medium of claim 10, wherein the stored instructions to determine the pixel weights further comprises stored instructions that when executed causes the processor to:
   for a given candidate pixel of the plurality of candidate pixels, determine if a function of a sensitivity for the given candidate pixel exceeds a threshold; and
   responsive to the function of the sensitivity not exceeding the threshold, assign to function of the sensitivity as a pixel weight for the given candidate pixel.

18. The non-transitory computer-readable storage medium of claim 10, wherein the stored instructions to determine the pixel weights further comprises stored instructions that when executed causes the processor to:
   for a given candidate pixel of the plurality of candidate pixels, determine if a function of a sensitivity for the given candidate pixel exceeds a threshold; and
   responsive to the function of the sensitivity exceeding the threshold, assign a constant value as a pixel weight for the given candidate pixel.

19. The non-transitory computer-readable storage medium of claim 10, wherein the stored instructions to determine the value for the virtual pixel based on the weighted combination of the plurality of candidate pixels using the pixel weights further comprises stored instructions that when executed causes the processor to:
   obtain a quality threshold for the virtual pixel;
   identify a minimum subset of the candidate pixels such that when corresponding pixel weights are added in order of decreasing weight meet or exceed the quality threshold; and
   determining the value for the virtual pixel as a weighted combination of the minimum subset of the candidate pixels.

20. An imaging system comprising:
   a camera array comprising a plurality of physical imagers;
   one or more processors; and
   a non-transitory computer-readable storage medium storing instructions for synthesizing an image corresponding to a virtual perspective of a scene, the instructions when executed by at least one of the one or more processors of the imaging system, causing the imaging system to:
      determine, for a virtual pixel of an image corresponding to the virtual perspective of the scene based on an initial predicted surface geometry of the scene, a plurality of candidate pixels from different physical imagers, of the plurality of physical imagers, that are predicted to correspond to a same world point in the scene as the virtual pixel;
      determine pixel weights for each of the plurality of candidate pixels based on respective sensitivities of each of the plurality of candidate pixels to an error in the initial predicted surface geometry; and
      determine a value for the virtual pixel based on a weighted combination of the plurality of candidate pixels using the pixel weights.

* * * * *